(12) United States Patent
Fiorenza et al.

(10) Patent No.: US 7,877,716 B2
(45) Date of Patent: *Jan. 25, 2011

(54) COMPUTER PROGRAM PRODUCTS FOR DETERMINING STOPPING POWERS OF DESIGN STRUCTURES WITH RESPECT TO A TRAVELING PARTICLE

(75) Inventors: Giovanni Fiorenza, Pomona, NY (US); Conal E. Murray, Yorktown Heights, NY (US); Kenneth P. Rodbell, Sandy Hook, NY (US); Henry Tang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

This patent is subject to a terminal disclaimer.

(21) Appl. No.: 12/111,529

(22) Filed: Apr. 29, 2008

(65) Prior Publication Data

US 2008/0201681 A1    Aug. 21, 2008

Related U.S. Application Data

(63) Continuation of application No. 11/618,993, filed on Jan. 2, 2007, now Pat. No. 7,386,817.

(51) Int. Cl.
*G06F 17/50* (2006.01)
*G06F 19/00* (2006.01)
*G06G 7/62* (2006.01)

(52) U.S. Cl. .................. 716/4; 716/5; 703/13

(58) Field of Classification Search .......... 716/4, 716/5; 703/13
See application file for complete search history.

(56) References Cited

U.S. PATENT DOCUMENTS

| | | |
|---|---|---|
| 6,348,356 B1 | 2/2002 | Shabde et al. |
| 6,507,511 B1 | 1/2003 | Barth, Jr. et al. |
| 6,538,334 B2 | 3/2003 | Akram et al. |
| 6,567,292 B1 | 5/2003 | King |
| 6,661,093 B2 | 12/2003 | Ujiie et al. |
| 6,723,597 B2 | 4/2004 | Abbott et al. |
| 6,782,525 B2 | 8/2004 | Garza et al. |
| 6,794,901 B2 | 9/2004 | Bernstein et al. |
| 2003/0163295 A1 | 8/2003 | Jakatdar et al. |

*Primary Examiner*—Sun J Lin
(74) *Attorney, Agent, or Firm*—Schmeiser, Olsen & Watts; Louis J. Percello (57) ABSTRACT

A computer program product, comprising a computer readable storage device having a computer readable program code stored therein, said program code including an algorithm adapted to be executed by a computer to implement a method. First, design information of a design structure is provided including a back-end-of-line layer of an integrated circuit which includes N interconnect layers, wherein N is a positive integer. Next, each interconnect layer is divided into multiple pixels. Next, a first path of a traveling particle in a first interconnect layer of the N interconnect layers is determined. Next, M path pixels of the multiple pixels of the first interconnect layer on the first path of the traveling particle are identified, wherein M is a positive integer. Next, a first loss energy lost by the traveling particle due to its completely passing through a first pixel of the M path pixels is determined.

11 Claims, 4 Drawing Sheets

COMPUTER PROGRAM PRODUCTS FOR DETERMINING STOPPING POWERS OF DESIGN STRUCTURES WITH RESPECT TO A TRAVELING PARTICLE

This application is a continuation application claiming priority to Ser. No. 11/618,993, filed Jan. 2, 2007, now U.S. Pat. No. 7,386,817, issued Jun. 10, 2008.

FIELD OF THE INVENTION

The present invention relates generally to a stopping power of a design structure with respect to a traveling particle and more particularly to the determination of the stopping power of the design structure with respect to the traveling particle.

BACKGROUND OF THE INVENTION

A typical semiconductor chip comprises a back-end-of-line (BEOL) layer on top of a front-end-of-line (FEOL) layer, wherein the semiconductor devices reside at bottom surface of the BEOL layer (i.e., at top surface of the FEOL layer). Assume that a traveling particle impacting on the top surface of the chip goes through the BEOL layer to impact on the semiconductor devices of the chip. The energy of the traveling particle when it hits the semiconductor devices at the bottom of the BEOL layer determines the susceptibility of the semiconductor devices to soft-errors. Therefore, there is a need for a method of determining a stopping power of the BEOL layer with respect to the traveling particle.

SUMMARY OF THE INVENTION

The present invention provides a method of determining a stopping power of a design structure of an integrated circuit with respect to a traveling particle, the method comprising providing design information of the design structure comprising a back-end-of-line layer of the integrated circuit which includes N interconnect layers, N being an integer greater than 1; dividing each interconnect layer of the N interconnect layers into multiple pixels, such that the multiple pixels of the back-end-of-line layer form a three dimensional array of pixels; determining a first path of the traveling particle in a first interconnect layer of the N interconnect layers; identifying M path pixels of the multiple pixels of the first interconnect layer on the first path of the traveling particle, M being a positive integer; determining a first loss energy lost by the traveling particle due to its completely passing through a first pixel of the M path pixels; comparing the first loss energy and a first starting energy, the first starting energy being an energy of the traveling particle when it enters the first pixel of the M path pixels; and determining that the traveling particle gets absorbed by the first pixel of the M path pixels if, as a result of said comparing the first loss energy, the first loss energy is greater than the first starting energy.

The present invention provides a method of determining a stopping power of the BEOL layer with respect to the traveling particle.

DETAILED DESCRIPTION OF THE INVENTION

Figure 1:
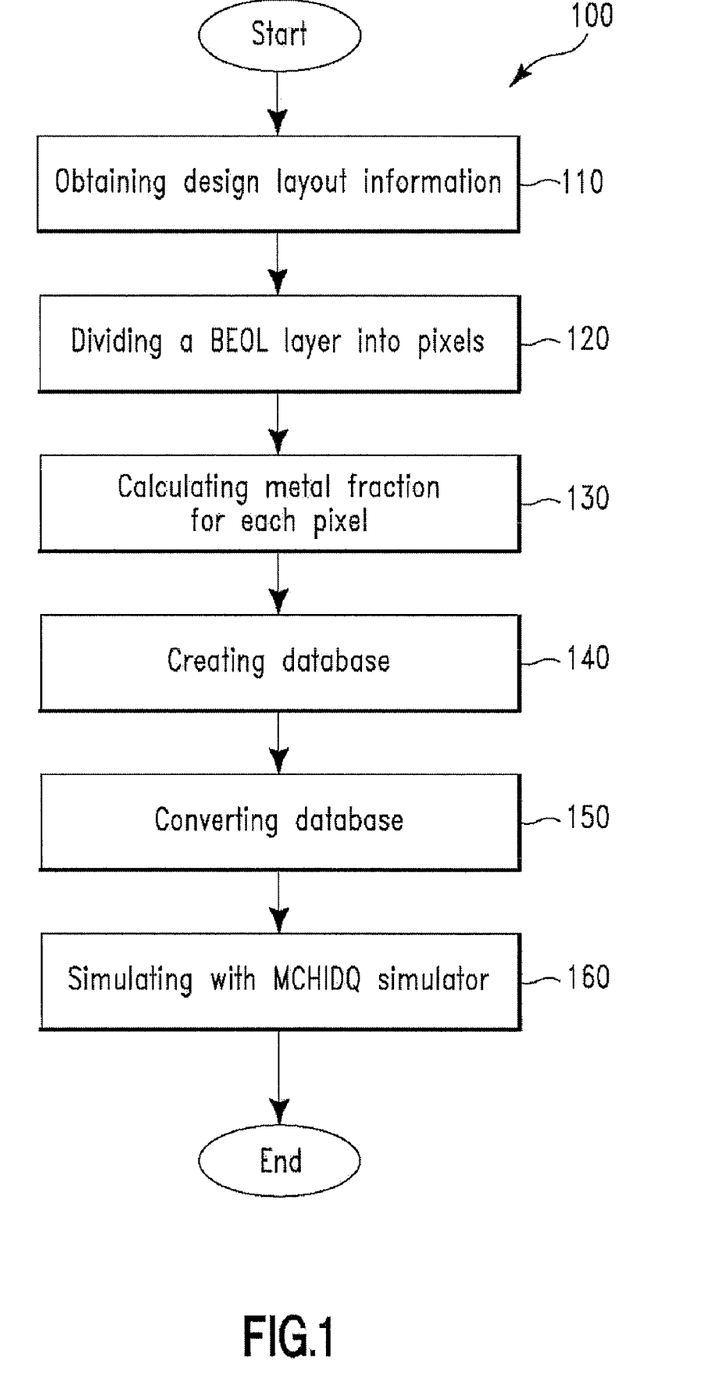
FIG. 1 shows a flowchart that illustrates a method for determining the susceptibility of semiconductor devices in a chip to soft-errors, in accordance with embodiments of the present invention.

FIG. 1 shows a flowchart that illustrates a method 100 for determining the susceptibility of semiconductor devices (not shown) in a chip 200 (FIG. 2) to soft-errors, in accordance with embodiments of the present invention. More specifically, the method 100 determines the susceptibility of the semiconductor devices to soft-errors by determining the stopping power of a back-end-of-line (BEOL) layer 220 (not shown in FIG. 1 but can be seen in FIG. 2) which is the ability of the BEOL layer 220 to stop energetic particles (not shown) from traveling through it. In one embodiment, the BEOL layer 220 comprises electrically conductive and dielectric materials. It should be noted that a soft-error is an error caused by energetic particles that travel through the semiconductor devices resulting in charge being created. This charge may cause the semiconductor device to change to a wrong, unintended state (i.e., a soft-error). The particles that cause soft-errors can be cosmic particles or by-products of nuclear decay which occurs naturally in certain materials used in the semiconductor device manufacture.

In one embodiment, the method 100 starts with a step 110 in which design layout information of the chip 200 is obtained. The design layout information is contained in design files. The design files contain information of a front-end-of-line (FEOL) layer 210 (FIG. 2) and the BEOL layer 220 (FIG. 2) of the chip 200. More specifically, with reference to FIG. 2, in one embodiment, the FEOL layer 210 contains semiconductor devices such as transistors, resistors, capacitors, etc. (not shown) of the chip 200. The BEOL layer 220 (i) comprises interconnect layers 222, 224, 226, and 228 on top of the FEOL layer 210, (ii) contains metal lines and vias (not shown), and (iii) connects the semiconductor devices of the FEOL layer 210 to outside the chip 200. In one embodiment, there are four design files for four interconnect layers 222, 224, 226, and 228, wherein each of the four design files contains the information about positions of metal and dielectric regions in the corresponding interconnect layer. The design files are generated using software tools (e.g., Cadence).

Figure 2:
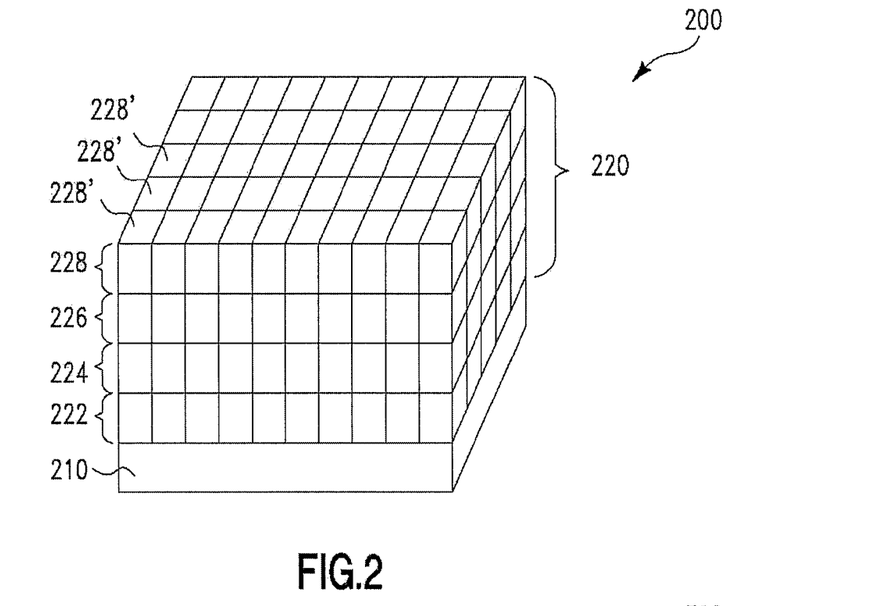
FIG. 2 shows a perspective view of a chip, in accordance with embodiments of the present invention.

Next, in step 120, in one embodiment, each interconnect layer of the BEOL layer 220 is divided into pixels. More specifically, with reference to FIG. 2, the interconnect layer 228 is divided into pixels 228'. The bottom surfaces of the pixels 228' are at the bottom surface of the interconnect layer 228. The top surfaces of the pixels 228' are at the top surface of the interconnect layer 228. The heights of the pixels 228' are equal to the height of the interconnect layer 228. In one embodiment, the dimensions of each pixel 228' in the interconnect layer 228 are the same. The interconnect layers 222, 224, and 226 are divided into pixels in a manner similar to the manner in which the interconnect layer 228 is divided into pixels 228'. Illustratively, the pixels of the interconnect layers 222, 224, 226, and 228 are aligned as shown in FIG. 2.

Next, with reference to FIG. 1, in step 130, in one embodiment, the metal fraction of each pixel of the BEOL layer 220 is calculated. More specifically, the metal fraction of a pixel represents the fraction in volume of metal within the pixel. The metal fraction of each pixel 228' is calculated using the information in the design file which corresponds to the interconnect layer 228. Similarly, the metal fraction of each pixel of the interconnect layer 226 is calculated using the information in the design file which corresponds to the interconnect layer 226. The metal fraction of each pixel of the interconnect layers 222 and 224 is calculated in a similar manner. In one embodiment, the metal fraction of each pixel is calculated by a software program using conventional design rule checking algorithms (e.g., a software program called Niagara can be used).

In one embodiment, although the BEOL layer 220 comprises diffusion barrier materials (not shown) and capping materials (not shown), the relative fraction of these materials is ignored for simplicity. As a result, the dielectric fraction of each pixel is equal to one minus the metal fraction of the pixel. For instance, the dielectric fraction of a pixel 228' is equal to one minus the metal fraction of that pixel 228'. In one embodiment, the information about the metal fractions of the pixels 228' in the interconnect layer 228 is output into a fraction file. The fraction file also contains position information of the pixels 228'. Similarly, the information about the metal fractions of pixels in the interconnect layers 222, 224, and 226 is output into three fraction files. As a result, the metal fraction information of the pixels in the BEOL layer 220 is output to four fraction files each of which contains the metal fraction information of the pixels of the corresponding interconnect layer. In summary, after the step 130 is performed, the position and the metal fraction of each pixel of an interconnect layer is stored in the corresponding fraction file.

Next, in step 140, in one embodiment, a database is created. More specifically, the database is created by incorporating the four fraction files and a technology file resulting in four 3-D matrix files. The technology file contains information regarding (i) the heights (thicknesses) of the interconnect layers 222, 224, 226, and 228, (ii) the specific material of the metal within each interconnect layer (e.g., Cu, W, Al), and (iii) the specific material of the dielectric (e.g., silicon dioxide, high-k dielectric material). As a result, after the step 140 is performed, the position, metal fraction, the height, the specific material of the metal, and the specific material of the dielectric of each pixel in an interconnect layer is stored in the corresponding 3-D matrix file. In one embodiment, the incorporation the four fraction files and the technology file resulting in the four 3-D matrix files can be performed by a software tool.

Next, in step 150, in one embodiment, the database is converted into formats which can be understood by a MCHIDQ (Monte Carlo heavy ion charge deposition) simulator (not shown). In one embodiment, the conversion can be performed by Geometry Interpreter (not shown). More specifically, the Geometry Interpreter consists of interface codes which access and process the input data from the four 3-D matrix files and convert the input data into the formats which can be understood by the MCHIDQ simulator.

Next, in step 160, in one embodiment, the MCHIDQ simulator is used for simulation. The MCHIDQ simulator consists of simulation codes that are based on Monte Carlo particle transport algorithms. In one embodiment, in the step 160, the MCHIDQ simulator receives as input the information about an energetic particle impinging on the BEOL layer 220. Then, the MCHIDQ simulator determines whether the energetic particle completely passes through the BEOL layer 220, as well as the energetic particle's energy when the energetic particle exits the BEOL layer 220. The energetic particle after exiting the BEOL layer 220 can be referred to as the exit energetic particle, whereas the energy of the energetic particle after it exits the BEOL layer 220 can be referred to as exit energy of the energetic particle. More specifically, in one embodiment, the MCHIDQ simulator receives such the information about the energetic particle as the kinetic energy, the position of impact, the angle of impact, the weight of the energetic particle, the charge of the energetic particle, etc. The energetic particle can be a cosmic ray particle such as neutron, proton, meson (such as pion), lepton (such as electron, positron, muon or tau), x-ray, or it can be any ionic species in the periodic table.

In the embodiments described above, the MCHIDQ simulator receives as input the information about the energetic particle impinging on the BEOL layer 220. In an alternative embodiment, the MCHIDQ simulator generates an energetic particle impinging on the BEOL layer 220. More specifically, the MCHIDQ simulator generates all the information regarding the energetic particle such as the kinetic energy, the position of impact, the angle of impact, the weight of the energetic particle, the charge of the energetic particle, etc.

In one embodiment, from the information of the energetic particle, the MCHIDQ simulator can determine the path of the energetic particle in the interconnect layer 228. Next, the MCHIDQ simulator identifies the pixels in the interconnect layer 228 on the path of the energetic particle. Assume that there are n pixels (n is a positive integer) in the interconnect layer 228 on the path of the energetic particle. Assume further that the energy of the energetic particle at top surface of the interconnect layer 228 is a starting energy E0. Then, the MCHIDQ simulator can determine a loss energy E1 lost by the energetic particle due to its completely passing through the first pixel of the n pixels in the interconnect layer 228 on the path of the energetic particle. Then, from the determined loss energy E1, the MCHIDQ simulator determines whether (i) the energetic particle gets absorbed by the first pixel of the n pixels (i.e., does not pass through the BEOL layer 220) or (ii) the energetic particle completely passes though the first pixel of the n pixels.

Assume that the energetic particle completely passes through the first pixel of the n pixels. From the starting energy E0 and the loss energy E1, the MCHIDQ simulator determines the energy of the energetic particle at exit point of the first pixel. It should be noted that the energy of the energetic particle at exit point of the first pixel is starting energy of the energetic particle going to the second pixel of the n pixels. Similarly, the MCHIDQ simulator can determine whether (i) the energetic particle gets absorbed by the second pixel of the n pixels (i.e., does not pass through the BEOL layer 220) or (ii) the energetic particle completely passes though the second pixel of the n pixels. In case of the energetic particle completely passing through the second pixel of the n pixels, the MCHIDQ can determine a loss energy E2 and from that the MCHIDQ calculates the energetic particle's energy at exit point of the second pixel of the n pixels, and so on. As a result, the MCHIDQ simulator can determine (i) whether the energetic particle completely passes through the interconnect layer 228, as well as (ii) its energy at exit point of the interconnect layer 228 if the energetic particle completely passes through the interconnect layer 228. It should be noted that if the energetic particle completely passes through the interconnect layer 228, the energy of the energetic particle at exit point of the interconnect layer 228 is starting energy of the energetic particle going to the interconnect layer 226. Then, the MCHIDQ simulator performs calculation for the interconnect layer 226 in a manner similar to the manner in which the MCHIQ simulator calculates for the interconnect layer 228, and so on for the interconnect layers 224 and 222.

It should be noted that, after exiting the interconnect layer 222 (i.e., exiting the BEOL layer 220), the energetic particle impacts on the semiconductor devices at top of the FEOL layer 210. In one embodiment, with the exit energy of the energetic particle at the exit point of the BEOL layer 220 determined by the MCHIDQ simulator, it is possible to determine the susceptibility of the semiconductor devices located at the top of the FEOL layer 210 (i.e., at bottom of the BEOL layer 220) to soft-errors caused by the energetic particle.

In one embodiment, the MCHIDQ simulator can be run N times to simulate a beam of N identical energetic particles that have the same kinetic energy, position of impact, angle of impact, and weight of the energetic particle (N is a positive integer). For each energetic particle of the N energetic particles, the MCHIDQ simulator determines (i) whether the energetic particle completely passes through the BEOL layer 220, as well as (ii) its energy at exit point of the BEOL layer 220 if the energetic particle completely passes through the BEOL layer 220. It should be noted that the energies lost by the N energetic particles due to completely passing through the BEOL layer 220 as determined by the MCHIDQ simulator are not necessarily the same.

In summary, the method 100 determines the susceptibility of the semiconductor devices in the chip 200 to soft-errors by determining the stopping power of the BEOL layer 220. More specifically, the method 100 creates the database containing information of each pixel in the BEOL layer 220. As a result, given the information of an energetic particle (such as kinetic energy, position of impact, angle of impact, weight of the energetic particle, charged of the energetic particle, etc.), the method 100 calculates the exit energy of the energetic particle at exit point of the BEOL layer 220 (where the semiconductor devices are located). Therefore, the susceptibility of the semiconductor devices in the chip 200 to soft-errors caused by the energetic particle can be determined.

Figure 3:
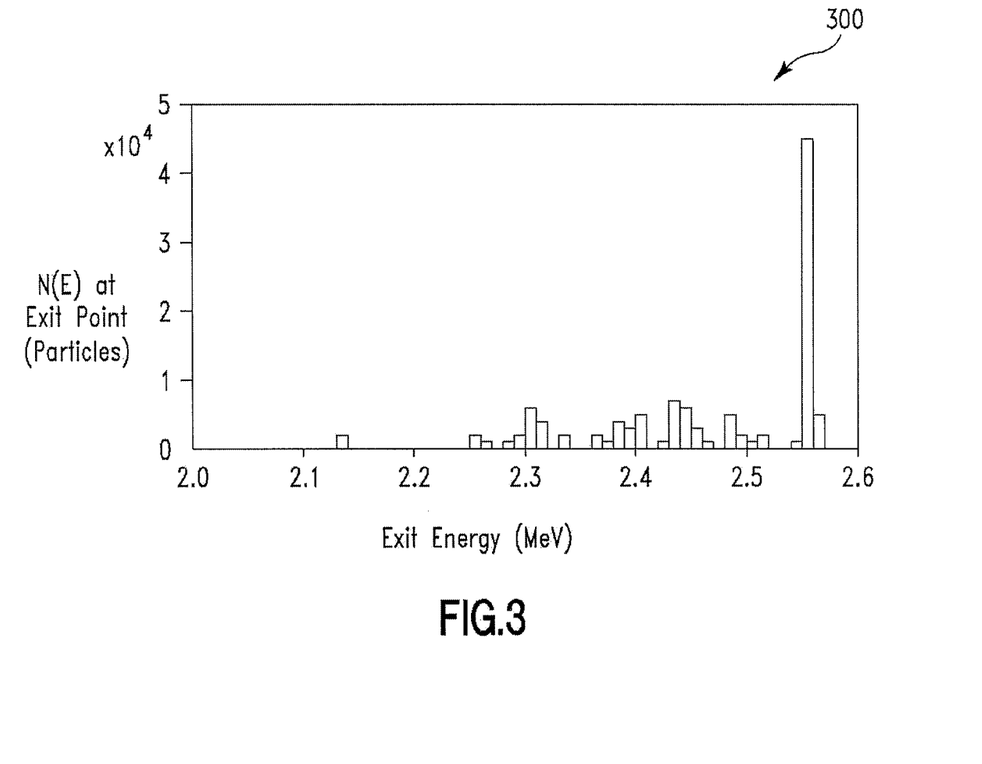
FIG. 3 shows a graph which depicts an exit energy distribution of a first beam of ion particles which comprise $5 \times 10^4$ lithium ($^7$Li) ions after they travel through the BEOL layer using copper metallization, in accordance with embodiments of the present invention.
Figure 4:
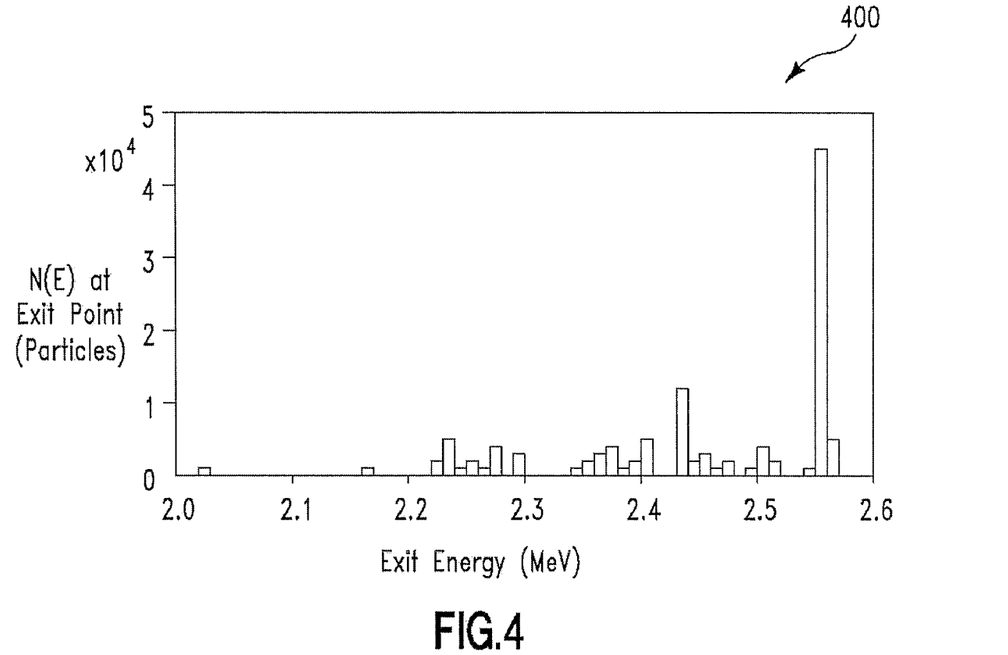
FIG. 4 shows a graph which depicts the exit energy distribution of a second beam of ion particles which comprise $5 \times 10^4$ lithium ($^7$Li) ions after they travel through the BEOL layer using tungsten metallization, in accordance with embodiments of the present invention.
Figure 5:
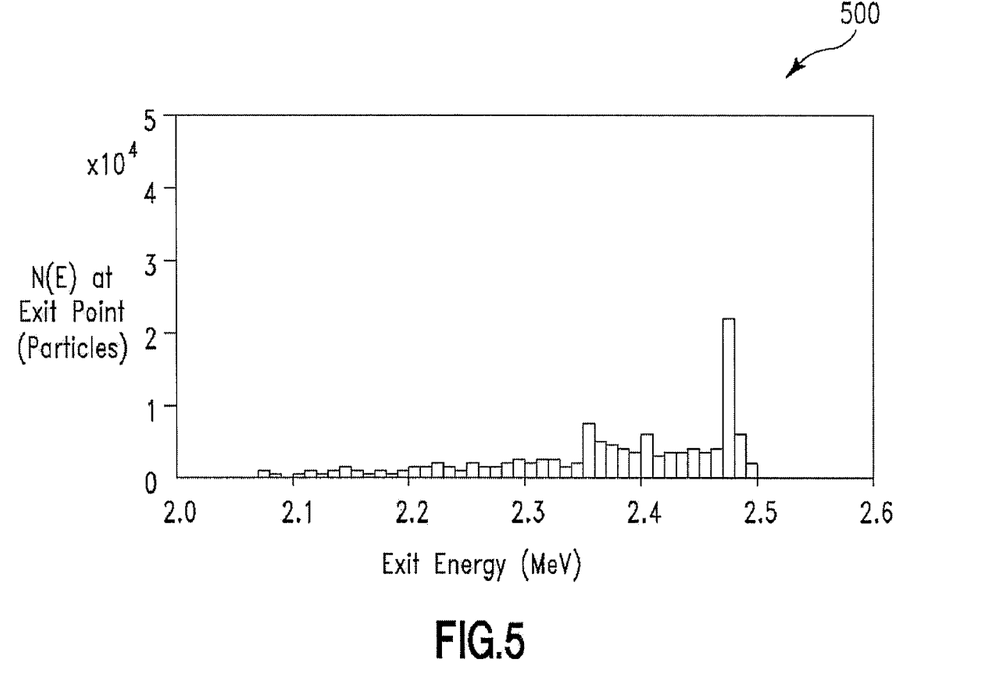
FIG. 5 shows a graph which depicts the exit energy distribution of a third beam of ion particles which comprise $5 \times 10^4$ lithium ($^7$Li) ions after they travel through the BEOL layer using copper metallization, in accordance with embodiments of the present invention.

FIGS. 3-5 are graphs 300, 400, and 500 illustrating the results of an application of the method 100 to the structure 200 of FIG. 2 for three different beams of ion particles.

FIG. 3 shows the graph 300 which depicts the exit energy distribution of a first beam of ion particles which comprise $5 \times 10^4$ lithium ($^7$Li) ions after they travel through the BEOL layer 220 using copper lines, in accordance with embodiments of the present invention. More specifically, these $5 \times 10^4$ lithium ions possess 3 MeV energy when they impinge on a certain location (not shown) on the top surface of the BEOL layer 220 in a direction perpendicular to the top surface of the BEOL layer 220. After the simulation, the exit energetic particles are divided into groups of the same exit energy ranges.

For instance, as shown in FIG. 3, there are $4.5 \times 10^4$ lithium ion particles whose exit energies are in the range from 2.55 MeV to 2.56 MeV. There is no lithium ion particle whose exit energy is in the range from 2.0 MeV to 2.1 MeV. As a result of the simulation of the method 100, there is no ion particle having exit energy in the ranges below 2.0 MeV or above 2.6 MeV, therefore these exit energy ranges are omitted from the graph 300 for simplicity. It should be noted that by adding all the numbers of lithium ion particles in all the exit energy ranges, the total number of lithium ion particles that completely pass through the BEOL layer 220 can be determined.

FIG. 4 shows the graph 400 which depicts the exit energy distribution of a second beam of ion particles which comprise $5 \times 10^4$ lithium ($^7$Li) ions after they travel through the BEOL layer 220 using tungsten metallization, in accordance with embodiments of the present invention. More specifically, these $5 \times 10^4$ lithium ions possess 3 MeV energy when they impinge on a certain location (not shown) on the top surface of the BEOL layer 220 in a direction perpendicular to the top surface of the BEOL layer 220. After the simulation, the exit energetic particles are divided into groups of the same energy ranges.

For instance, as shown in FIG. 4, there are $4.5 \times 10^4$ ion particles whose exit energies are in the range from 2.55 MeV to 2.56 MeV. There are $0.1 \times 10^4$ lithium ion particles whose exit energies are in the range from 2.02 MeV to 2.03 MeV. As a result of the simulation of the method 100, there is no lithium ion particle having exit energy in the ranges below 2.0 MeV or above 2.6 MeV, therefore these exit energy ranges are omitted from the graph 400 for simplicity. It should be noted that by adding all the numbers of lithium ion particles in all the exit energy ranges, the total number of lithium ion particles that completely pass through the BEOL layer 220 can be determined.

As shown in FIG. 4, the exit energy distribution of the lithium ion particles contains more lithium ion particles having lower energies than in the case of FIG. 3. For instance, FIG. 4 shows that there are $0.1 \times 10^4$ lithium ion particles whose exit energies are in the range from 2.02 MeV to 2.03 MeV. As a result, there are $0.1 \times 10^4$ lithium ion particles whose exit energies are in the range from 0 to 2.1 MeV, whereas there is no lithium ion particle having exit energy in the same range (i.e., from 0 to 2.1 MeV) in the case of FIG. 3. As a result, FIGS. 3 and 4 show that the BEOL layer 220 in the case of FIG. 4 (using tungsten lines) has a higher stopping power than the BEOL layer 220 in the case of FIG. 3 (using copper lines). This is because tungsten has a higher stopping power than copper.

FIG. 5 shows the graph 500 which depicts the exit energy distribution of a third beam of ion particles which comprise $5 \times 10^4$ lithium ($^7$Li) ions after they travel through the BEOL layer 220 using copper lines, in accordance with embodiments of the present invention. More specifically, these $5 \times 10^4$ lithium ions possess 3 MeV energy when they impinge on a certain location (not shown) on the top surface of the BEOL layer 220 in a direction of 60° to the top surface of the BEOL layer 220. As a result, the path of the ion particles of the third beam is longer than the path of the ion particles of the first beam when they travel through the BEOL layer 220. After the simulation, the exit energetic particles are divided into groups of the same energy ranges.

For instance, as shown in FIG. 5, there are $0.1 \times 10^4$ lithium ion particles whose exit energies are in the range from 2.07 MeV to 2.08 MeV. There are $0.05 \times 10^4$ lithium ion particles whose exit energies are in the range from 2.08 MeV to 2.09 MeV. As a result of the simulation of the method 100, there is no lithium ion particle having exit energy in the ranges below 2.0 MeV or above 2.6 MeV, therefore these exit energy ranges are omitted from the graph 500 for simplicity. It should be noted that by adding all the numbers of lithium ion particles in all the exit energy ranges, the total number of lithium ion particles that completely pass through the BEOL layer 220 can be determined.

As shown in FIG. 5, there is an appreciable shift to lower energy region of the ion particles after completely passing through the BEOL layer 220 in comparison with the graph 300 of FIG. 3. More specifically, the exit energy distribution of the lithium ion particles contains more ions having lower energies than in the case of FIG. 3. For instance, FIG. 5 shows that there are $0.1 \times 10^4$ lithium ion particles whose exit energies are in the range from 2.07 MeV to 2.08 MeV. There are $0.05 \times 10^4$ lithium ion particles whose exit energies are in the range from 2.08 MeV to 2.09 MeV. As a result, there are $0.15 \times 10^4$ lithium ion particles whose exit energies are in the range from 0 to 2.1 MeV, whereas there is no lithium ion particle having exit energy in the same range (i.e., from 0 to 2.1 MeV) in the case of FIG. 3. As a result, with the impact of the first beam, the semiconductor devices are more susceptible to soft-errors than with the impact of the third beam. This is because the path of the ion particles of the third beam is longer than the path of the ion particles of the first beam when they travel through the BEOL layer 220.

In the embodiments described above, the BEOL layer 220 comprises four interconnect layers 222, 224, 226, and 228. In general, the BEOL layer 220 can comprise any number of interconnect layers.

In the embodiments described above, the method 100 is applied to determine the stopping power of the BEOL layer 220. In general, the method 100 can be applied to determine the stopping power of any region of interest such as the FEOL layer 210 or the BEOL layer of the entire wafer, etc.

The term "stopping power" is defined quantitatively as the energy lost by a traveling particle due to its completely passing through the BEOL layer 220. Therefore, stopping power of the BEOL layer 220 is a function of (i) the traveling particle's incident angle, initial energy, mass, etc. and (ii) characteristics of the BEOL materials.

Figure 6:
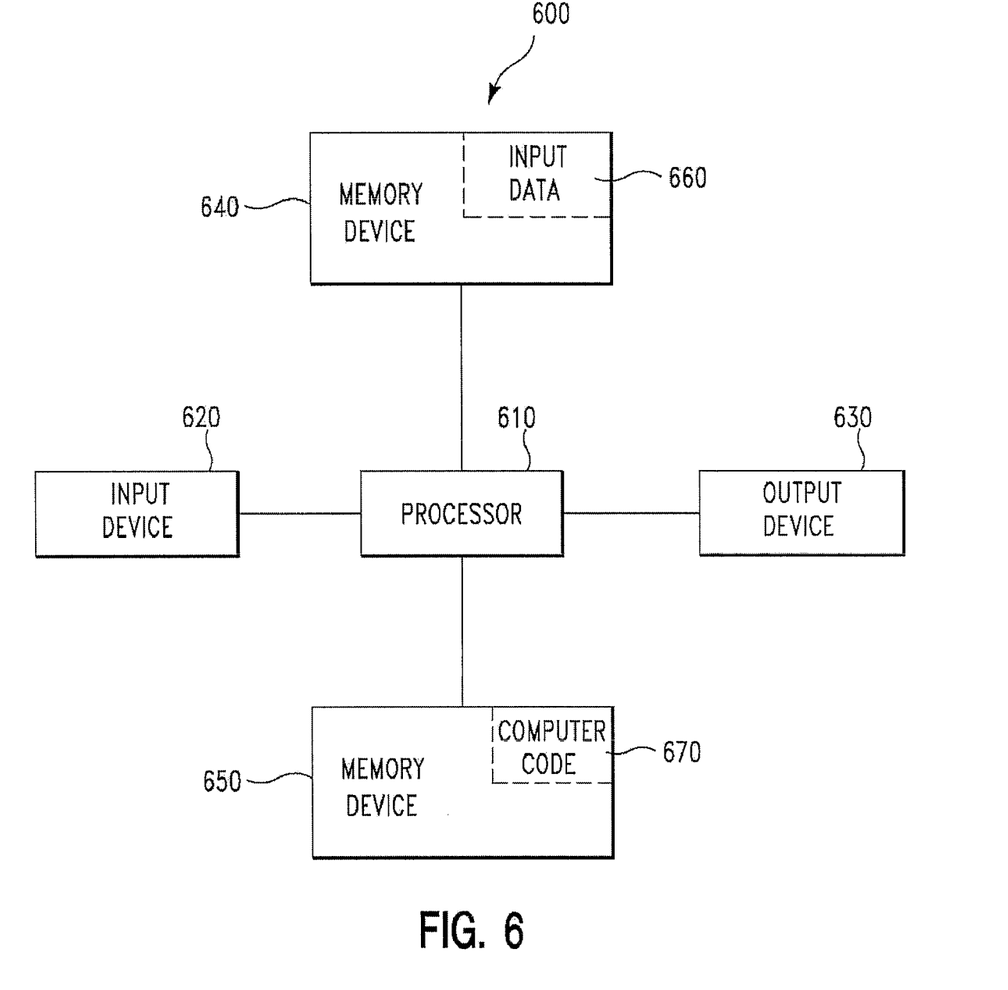
FIG. 6 illustrates a computer system used for determining a stopping power of a BEOL layer with respect to an energetic particle impacting on the top surface of the BEOL layer with a given energy, in accordance with embodiments of the present invention.

FIG. 6 illustrates a computer system 600 used for determining the stopping power of the BEOL layer 220 (FIG. 2) with respect to an energetic particle impacting on the top surface of the BEOL layer 220 with a given energy, in accordance with embodiments of the present invention. The computer system 600 comprises a processor 610, an input device 620 coupled to the processor 610, an output device 630 coupled to the processor 610, and memory devices 640 and 650 each coupled to the processor 610. The input device 620 may be, inter alia, a keyboard, a mouse, etc. The output device 630 may be, inter alia, a printer, a plotter, a computer screen, a magnetic tape, a removable hard disk, a floppy disk, etc. The memory devices 640 and 650 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 650 includes a computer code 670. The computer code 670 includes an algorithm for determining the stopping power of the BEOL 220 with reflects to the energetic particle impacting on the top surface of the BEOL layer 220 with the given energy. The processor 610 executes the computer code 670. The memory device 640 includes input data 660. The input data 660 includes input required by the computer code 670. The output device 630 displays output from the computer code 670. Either or both memory devices 640 and 650 (or one or more additional memory devices not shown in FIG. 6) may be used as a computer usable medium (or a computer readable medium or a program storage device) having a computer readable program code embodied therein and/or having other data stored therein, wherein the computer readable program code comprises the computer code 670. Generally, a computer program product (or, alternatively, an article of manufacture) of the computer system 600 may comprise said computer usable medium (or said program storage device).

While FIG. 6 shows the computer system 600 as a particular configuration of hardware and software, any configuration of hardware and software, as would be known to a person of ordinary skill in the art, may be utilized for the purposes stated supra in conjunction with the particular computer system 600 of FIG. 6. For example, the memory devices 640 and 650 may be portions of a single memory device rather than separate memory devices.

In the embodiments described above, with reference to FIG. 2, each interconnect layer of the BEOL layer 220 is divided into pixels whose heights are equal to the height (thickness) of the associated interconnect layer. In an alternative embodiment, each interconnect layer of the BEOL layer 220 can be vertically divided into multiple sub-layers (not shown) such that these sub-layers are on top of one another. Then, each of these sub-layers is divided into pixels whose heights are equal to the height (thickness) of the associated sub-layer.

In the embodiments described above, with reference to FIG. 2, all pixels of the BEOL layer 220 have the same lateral dimensions. Alternatively, pixels of different interconnect layers can have different lateral dimensions.

In the embodiments described above, with reference to FIG. 2, pixels of the same interconnect layer have the same lateral dimensions. Alternatively, pixels in different regions of the same interconnect layer can have different lateral dimensions.

It should be noted that the present invention applies to a great variety of particles. These particles may include charged particles such as protons, heavy ions, mesons (including pions and heavy mesons), leptons (electrons, positrons, positive muon & negative muon, positive tau particles and negative tau particles). These particles may also include electrically neutral particles such as neutrons and photons.

The present invention applies not only to primary traveling particles (i.e., particles that enter the BEOL layer 220 from outside) but also to secondary traveling particles (i.e., particles created by collisions between primary particles and nuclei in the BEOL layer 220). Such collisions that create the secondary traveling particles may involve nuclear reactions which include elastic processes, inelastic scattering, and spallation reactions. If the primary traveling particles are electrically neutral, then the resulting secondary traveling particles may be produced by elastic or inelastic nuclear processes. If a secondary traveling particle carries charge, it will ionize the BEOL layer 220.

Assume a primary traveling particle enters the BEOL layer 220. There are many possibilities that may occur. The primary traveling particle may (i) pass through the first pixel on its path, (ii) get absorbed in the first pixel, or (iii) undergo a collision with a nucleus of the first pixel resulting in the production of secondary traveling particle(s). If the primary traveling particle is a photon, it may (i) interact with an atom of the first pixel via photoelectric effect resulting in an ejection of a photo-electron $e^-$, (ii) scatters off an electron via Compton scattering and produces a Compton electron $e^-$, (iii) undergo a pair production process resulting in an electron $e^-$ and a positron $e^+$.

In one embodiment, if it is determined that the primary traveling particle collides with a nucleus, then it is determined whether secondary traveling particles are created by the collision. If it is determined that secondary traveling particles are created by the collision, then for each resulting secondary traveling particle, the initial energy and trajectory (i.e., traveling path) of the secondary traveling particle is determined using an external program (such as NUSPA). Then, from the determined energy and trajectory of the secondary traveling particle, the current invention can be used to determine the loss energies lost by the secondary traveling particle as it travels through pixels and layers of the BEOL layer 220.

The determination of these loss energies for the secondary traveling particle is similar to the determination of loss energies for the primary traveling particle (described in details above). More specifically, for each secondary traveling particle, a path of the secondary particle in the first interconnect layer 228 of the BEOL layer 220 is determined. Of course, the first pixel resides on this path of the secondary particle. Then, the path pixels residing on this path of the secondary particle are identified. Then, a first loss energy lost by this secondary traveling particle due to its traveling from location of creation/collision inside the first pixel to an exit point of the first pixel is determined and then is compared with the initial energy of the secondary traveling particle. If the loss energy is greater than the initial energy, it is determined that the secondary traveling particle gets absorbed by the first pixel. But if the loss energy is less than the initial energy, it is determined that the secondary traveling particle leaves the first pixel and enters a second pixel on its previously determined path. Then, the calculation continues in a manner similar to the manner in which the calculation for a primary traveling particle is carried out. While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer program product, comprising a computer readable storage device having a computer readable program code stored therein, said computer readable program code comprising an algorithm adapted to be executed by a computer to implement a method for determining a stopping power of a design structure of an integrated circuit with respect to a traveling particle impacting on the design structure, said method comprising:
   providing design information of the design structure comprising a back-end-of-line layer of the integrated circuit which includes N interconnect layers, wherein N is a positive integer;
   dividing each interconnect layer of the N interconnect layers into multiple pixels;
   determining a first path of the traveling particle in a first interconnect layer of the N interconnect layers;
   identifying M path pixels of the multiple pixels of the first interconnect layer on the first path of the traveling particle, wherein M is a positive integer; and
   determining a first loss energy lost by the traveling particle due to its completely passing through a first pixel of the M path pixels.

2. The computer program product of claim 1, wherein said determining a first loss energy comprises determining a first material fraction of the first pixel of the M path pixels,
   wherein the first material fraction represents a fraction in volume of a first material within the first pixel of the M path pixels.

3. The computer program product of claim 2, wherein said determining a first loss energy further comprises determining a second material fraction of the first pixel of the M path pixels,
   wherein the second material fraction represents a fraction in volume of a second material within the first pixel of the M path pixels.

4. The computer program product of claim 3,
   wherein the first material comprises a metal,
   wherein the second material comprises a dielectric material, and
   wherein said determining a second material fraction comprises subtracting the first material fraction from one.

5. A computer system comprising a processor and a computer readable memory unit coupled to the processor, said memory unit containing instructions that, when executed by the processor, implement a method for determining a stopping power of a design structure of an integrated circuit with respect to a traveling particle impacting on the design structure, said method comprising:
   providing design information of the design structure comprising a back-end-of-line layer of the integrated circuit which includes N interconnect layers, wherein N is a positive integer;
   dividing each interconnect layer of the N interconnect layers into multiple pixels;
   determining a first path of the traveling particle in a first interconnect layer of the N interconnect layers;
   identifying M path pixels of the multiple pixels of the first interconnect layer on the first path of the traveling particle, wherein M is a positive integer; and
   determining a first loss energy lost by the traveling particle due to its completely passing through a first pixel of the M path pixels.

6. The computer system of claim 5,
   wherein said determining a first loss energy comprises determining a first material fraction of the first pixel,
   wherein the first material fraction represents a fraction in volume of a first material within the first pixel,
   wherein said determining a first loss energy further comprises determining a second material fraction of the first pixel,
   wherein the second material fraction represents a fraction in volume of a second material within the first pixel,
   wherein the first material comprises a metal,
   wherein the second material comprises a dielectric material, and
   wherein said determining a second material fraction comprises subtracting the first material fraction from one fraction.

7. A computer program product, comprising a computer readable storage device having a computer readable program code stored therein, said computer readable program code comprising an algorithm adapted to be executed by a computer to implement a method for determining a stopping power of a design structure of an integrated circuit with respect to a primary traveling particle, said method comprising:
   providing design information of the design structure comprising a back-end-of-line layer of the integrated circuit which includes N interconnect layers, wherein N is a positive integer;
   dividing each interconnect layer of the N interconnect layers into multiple pixels;
   determining a first path of the first traveling particle in a first interconnect layer of the N interconnect layers;
   identifying M path pixels of the multiple pixels of the first interconnect layer on the first path of the first traveling particle, wherein M is a positive integer;
   determining if the primary traveling particle collides with a nucleus of a first pixel of the M path pixels;
   if it is determined that the primary traveling particle collides with the nucleus of the first pixel of the M path pixels, then determining whether a secondary traveling particle is created by a collision between the primary traveling particle and the nucleus;

if it is determined that a secondary traveling particle is created by the collision, then determining an initial energy and a trajectory of the secondary traveling particle in the first interconnect layer; and determining a first loss energy lost by the secondary traveling particle due to its completely passing through the first pixel of the M path pixels.

8. The computer program product of claim 7, wherein lateral dimensions of the multiple pixels within the corresponding interconnect layer of the N interconnect layers are equal.

9. The computer program product of claim 7, wherein lateral dimensions of the multiple pixels are not the same.

10. The computer program product of claim 7, wherein vertical dimensions of the multiple pixels of the corresponding interconnect layer of the N interconnect layers are equal to a thickness of the corresponding interconnect layer.

11. The computer program product of claim 7, wherein the step of dividing comprises the steps of:

vertically dividing each interconnect layer of the N interconnect layers into multiple sub-layers such that the multiple sub-layers are on top of one another; and dividing each sub-layer of the multiple sub-layers into the multiple pixels, wherein each pixel of the multiple pixels has a height equal a thickness of an associated sub-layer of the multiple sub-layers.

* * * * *